(12) United States Patent
Zhou et al.

(10) Patent No.: US 12,212,997 B2
(45) Date of Patent: Jan. 28, 2025

(54) INDICATION OF PREFERRED AND RESTRICTED BEAMS

(71) Applicant: QUALCOMM Incorporated, San Diego, CA (US)

(72) Inventors: Yan Zhou, San Diego, CA (US); Qian Zhang, Basking Ridge, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/703,677

(22) Filed: Mar. 24, 2022

(65) Prior Publication Data

US 2023/0308917 A1    Sep. 28, 2023

(51) Int. Cl.
*H04W 24/10* (2009.01)
*H04B 7/06* (2006.01)
*H04B 7/08* (2006.01)
*H04B 17/318* (2015.01)
*H04B 17/336* (2015.01)
*H04L 5/00* (2006.01)
*H04L 5/14* (2006.01)

(52) U.S. Cl.
CPC .......... *H04W 24/10* (2013.01); *H04B 7/0695* (2013.01); *H04B 7/088* (2013.01); *H04B 17/318* (2015.01); *H04B 17/336* (2015.01); *H04L 5/0051* (2013.01); *H04L 5/14* (2013.01)

(58) Field of Classification Search
CPC ..... H04W 24/10; H04B 7/0695; H04B 7/088; H04B 17/318; H04B 17/336; H04L 5/0051; H04L 5/14
See application file for complete search history.

(56) References Cited

U.S. PATENT DOCUMENTS

| | | | |
|---|---|---|---|
| 2020/0053661 A1* | 2/2020 | Yang | H04W 52/146 |
| 2020/0266908 A1* | 8/2020 | Qian | H04L 5/0094 |
| 2021/0006438 A1* | 1/2021 | Harrebek | H04W 24/10 |
| 2021/0084655 A1* | 3/2021 | Estevez | H04B 7/0408 |
| 2022/0116129 A1* | 4/2022 | Ying | H04B 7/0617 |
| 2022/0369302 A1* | 11/2022 | You | H04B 7/0695 |
| 2023/0090986 A1 | 3/2023 | Jang et al. | |
| 2023/0328562 A1* | 10/2023 | Bai | H04W 24/10 370/329 |
| 2024/0057073 A1* | 2/2024 | Zhang | H04W 24/10 |
| 2024/0098517 A1* | 3/2024 | Fakoorian | H04W 52/42 |

* cited by examiner

*Primary Examiner* — Deepa Belur
(74) *Attorney, Agent, or Firm* — Haynes and Boone, LLP

(57) ABSTRACT

Systems and methods for beam management in a wireless communication system are provided. In a network with a full duplex network entity communicating with two UEs, the network entity may configure cross-link interference (CLI) resources such that the interference between the devices may be characterized. One UE may transmit a reference signal which is read by the other device. Based on the measurement, a report may be sent to the network entity. The network entity may use the information in the report to then base scheduling decisions, and/or indicate to the UEs which beams are restricted from use in order to avoid excessive interference.

30 Claims, 10 Drawing Sheets

INDICATION OF PREFERRED AND RESTRICTED BEAMS

TECHNICAL FIELD

This application relates to wireless communication devices, systems, and methods, and more particularly to devices, systems, and methods for mitigating cross-link interference.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G), designed to provide a lower latency, a higher bandwidth or a higher throughput, and a higher reliability than LTE. In many instances, network devices operate in half-duplex mode, in which they are only transmitting or receiving at any given time. In order to increase flexibility and improve latency, full-duplex systems are considered. However, problems arise in full-duplex system, as interference between devices may occur that would otherwise not occur in a fully half-duplex system. Therefore, there exists a need for improved methods of wireless communication and associated devices and/or systems.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication performed by a network entity. The method comprises transmitting, to a first user equipment (UE), an indication of a cross link interference (CLI) transmission resource. The method further comprises transmitting, to a second UE, an indication of a CLI reception resource. The method further comprises receiving, from the second UE, a report comprising an indication based on a measurement of a reference signal associated with a first beam of the CLI transmission resource, the measurement associated with the CLI reception resource. The method further comprises transmitting, to the first UE, a communication based on the report.

Another aspect of the present disclosure includes a method of wireless communication performed by a user equipment (UE), the method comprising receiving, from a network entity, an indication of a cross link interference (CLI) transmission resource. The method further comprises transmitting, based on the CLI transmission resource, a reference signal using a first beam. The method further comprises receiving, from the network entity, a communication comprising an indication of a beam based on a measurement of the reference signal.

Another aspect of the present disclosure includes A method of wireless communication performed by a first user equipment (UE), the method comprising receiving, from a network entity, a cross link interference (CLI) reception resource. The method further comprises receiving, based on the CLI reception resource, a reference signal from a second UE via a first beam. The method further comprises transmitting, to the network entity, a report comprising an information based on a measurement of the reference signal.

Another aspect of the present disclosure includes A network entity, comprising a memory, a transceiver, and a processor coupled with the memory and the transceiver and configured, when executing instructions stored on the memory, to cause the network entity to transmit, to a first user equipment (UE), an indication of a cross link interference (CLI) transmission resource. The processor is further configured to transmit, to a second UE, an indication of a CLI reception resource. The processor is further configured to receive, from the second UE, a report comprising an indication based on a measurement of a reference signal associated with a first beam of the CLI transmission resource, the measurement associated with the CLI reception resource. The processor is further configured to transmit, to the first UE, a communication based on the report.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
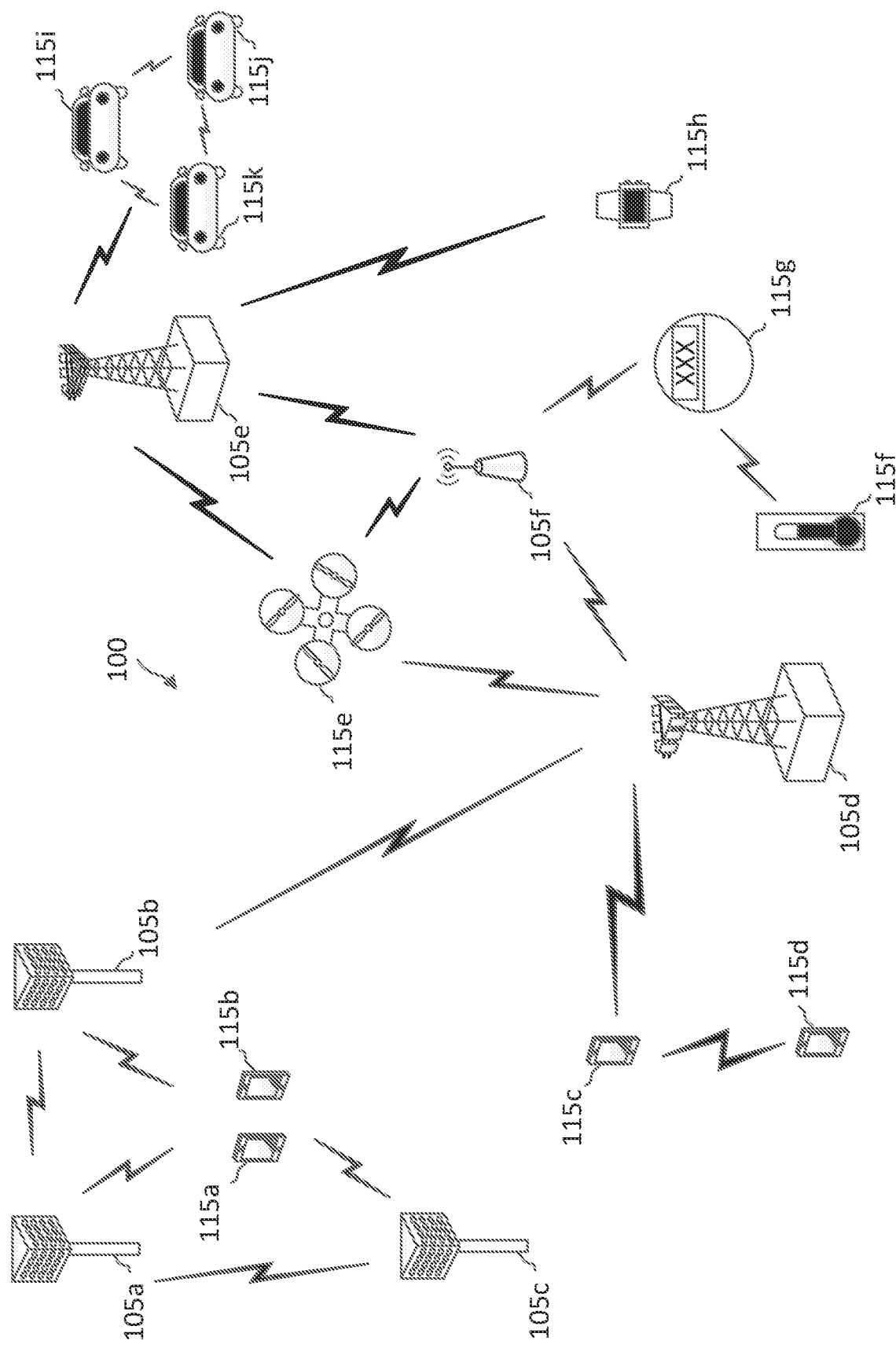
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (1-R2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present disclosure describes systems and methods for mitigating cross link interference (CLI). For example, interference between UEs communicating with the same network unit (e.g., a base station (BS), central unit (CU), distributed unit (DU), and/or radio unit (RU)) may be reduced. In some instances, the network unit may operate in a full-duplex mode such that one UE is transmitting an UL communication to the network unit, while another UE is receiving a DL communication from the network unit. In order to minimize interference between the UL and DL communications, the network unit may cause the UEs to measure and/or characterize the potential interference based on one or more transmit and/or receive beams. The network unit may select beams for UL and/or DL communications based on the measurements and/or characterizations. In this regard, the network unit may select the beams for UL and/or DL communications in order to minimize interference between the communications associated with different UEs.

Specifically, a network unit may transmit a cross link interference (CLI) transmission resource to a first UE. The CLI transmission resource may indicate one or more specific transmit beams. The network unit may transmit a CLI reception resource to a second UE. The CLI reception resource may indicate one or more specific receive beams. The CLI transmission resource and the CLI reception resource may be associated with transmission/reception at the same time (e.g., simultaneous and/or overlapping transmission and reception). Based on the CLI transmission and reception resources, the first UE may transmit a reference signal using the beam(s) indicated by the CLI transmission resource, while the second UE receives on the beam(s) indicated by the CLI reception resource. The second UE may perform a measurement of the reference signal. Measurements may include sounding reference signal-reference signal received power (SRS-RSRP), cross link interference-received signal strength (CLI-RSS), reference signal received power (RSRP), reference signal strength indicator (RSSI), reference signal received quality (RSRQ), signal to noise ratio (SNR), and/or signal to interference plus noise ratio (SINR). The second UE may send a report to the network that includes the measurement, an indication of the measurement, an indication of a preferred beam, an indication of a non-preferred beam, and/or an indication of a preferred/non-preferred beam pair.

The network unit may schedule communications with the UEs based on the report. The network unit may schedule the communications such that preferred beams are used when the BS is communicating with the UEs in a full-duplex mode in an effort to reduce interference. The network unit may select one or beams for the communications and/or determine one or more beams are not available for use for the communications. The network unit may send a message to one or both of the UEs indicating the selected and/or restricted beams. The beams may be selected and/or restricted at the level of an individual beam, a beam group, and/or an antenna panel.

Systems and methods described herein provide many advantages. For example, network devices may communicate more effectively with less interference between devices, especially between devices communicating with the same network entity operating in full-duplex. By allowing for broader use of full-duplex, communications may have lower latency. In addition, more efficient network resource utilization may be realized, which in turn contributes to reduction of power consumption and higher network throughput.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. an UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

A BS 105 of network 100 may communicate in full-duplex mode. When operating in full-duplex, a BS 105 may transmit DL signals to a UE 115 while receiving UL signals from another UE. In order to characterize the interference from the transmitting UE 115 on the receiving UE 115, a BS 105 may schedule cross-link interference (CLI) resources such that a UE transmits a reference signal which is measured by the other UE in order to determine preferred beams for full-duplex operation.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS 105 (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
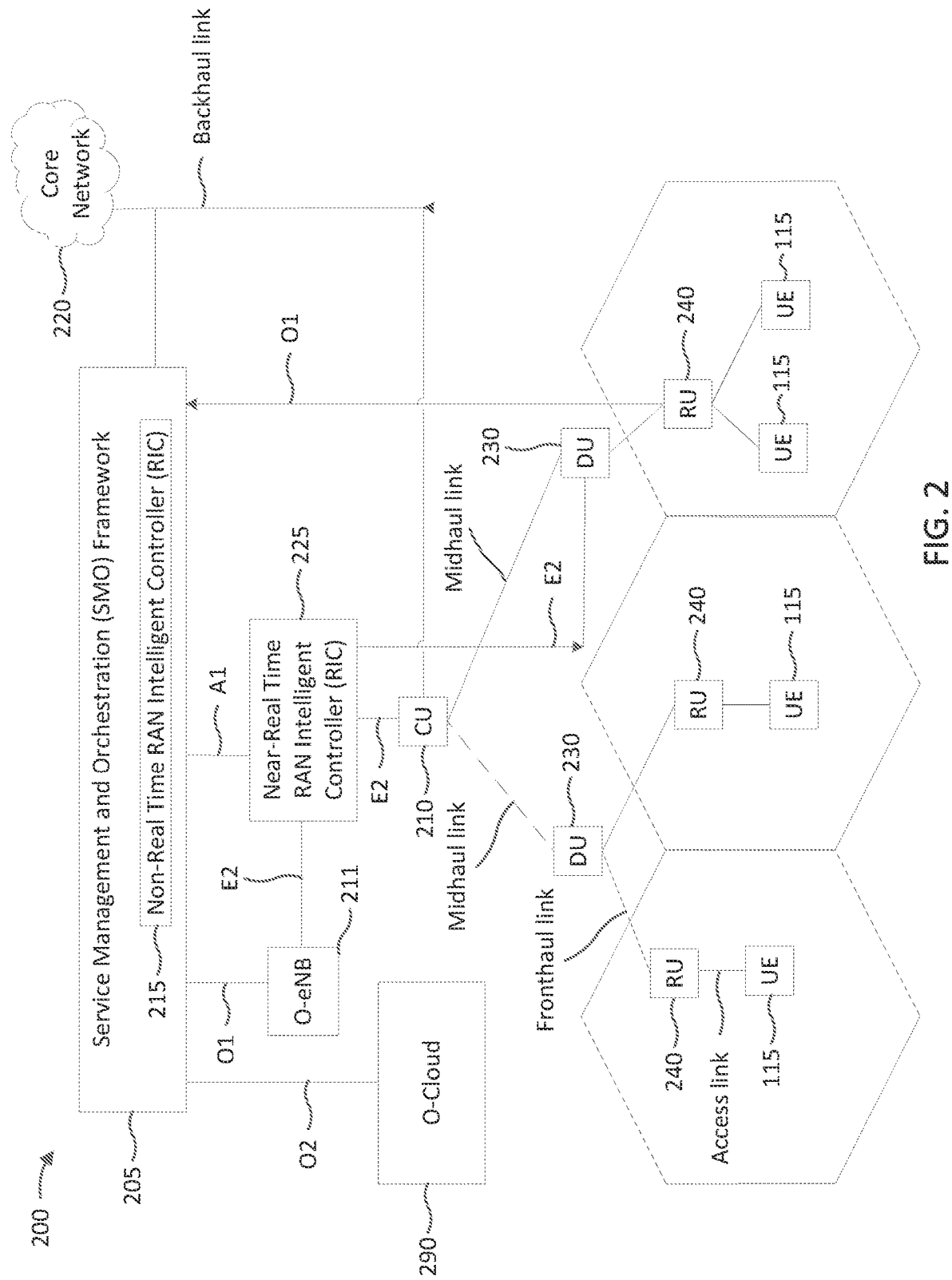
FIG. 2 illustrates an example portion of a wireless communications system that supports RU sharing techniques in wireless communications according to some aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
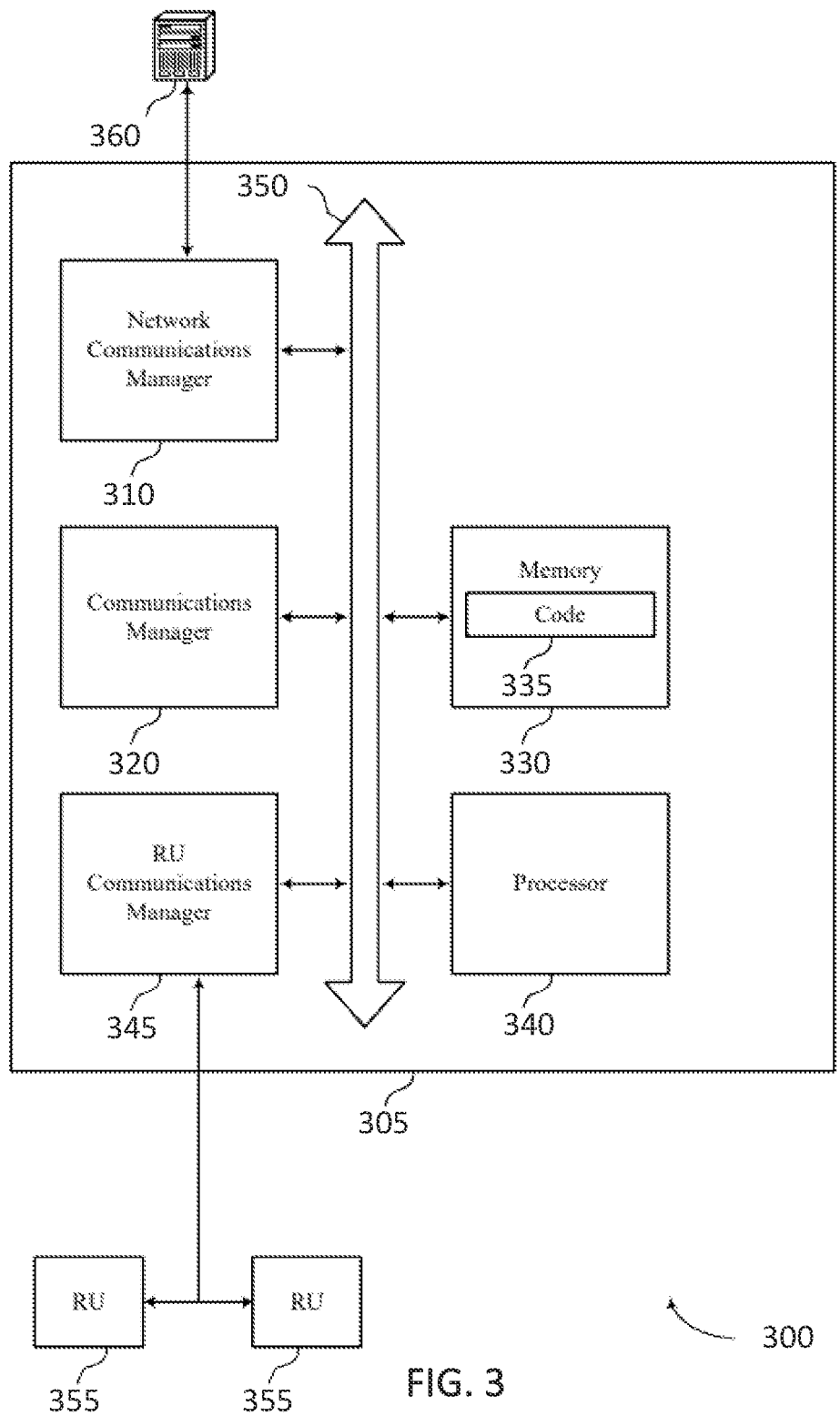
FIG. 3 illustrates a diagram of a system including a device that supports RU sharing techniques in wireless communications according to some aspects of the present disclosure.

FIG. 3 shows a diagram of a system 300 including a device 305 that supports RU sharing techniques in wireless communications in accordance with aspects of the present disclosure. The device 305 may communicate with one or more RUs 355. The device 305 may include components for bi-directional voice and data communications including components for transmitting and receiving communications, such as a communications manager 320, a network communications manager 310, a memory 330, code 335, a processor 340, and a RU communications manager 345. These components may be in electronic communication or otherwise coupled (e.g., operatively, communicatively, functionally, electronically, electrically) via one or more buses (e.g., a bus 350). One or more of the components of system 300 may perform functions as described herein with reference to FIGS. 2-10, for example functions described as performed by a base station or network entity.

The network communications manager 310 may manage communications with a core network 360 (e.g., via one or more wired backhaul links). For example, the network communications manager 310 may manage the transfer of data communications for client devices, such as one or more UEs 115.

The memory 330 may include RAM and ROM. The memory 330 may store computer-readable, computer-executable code 335 including instructions that, when executed by the processor 340, cause the device 305 to perform various functions described herein. The code 335 may be stored in a non-transitory computer-readable medium such as system memory or another type of memory. In some cases, the code 335 may not be directly executable by the processor 340 but may cause a computer (e.g., when compiled and executed) to perform functions described herein. In some cases, the memory 330 may contain, among other things, a BIOS which may control basic hardware or software operation such as the interaction with peripheral components or devices.

The processor 340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 340 may be configured to operate a memory array using a memory controller. In some other cases, a memory controller may be integrated into the processor 340. The processor 340 may be configured to execute computer-readable instructions stored in a memory (e.g., the memory 330) to cause the device 305 to perform various functions (e.g., functions or tasks supporting RU sharing techniques in wireless communications). For example, the device 305 or a component of the device 305 may include a processor 340 and memory 330 coupled to the processor 340, the processor 340 and memory 330 configured to perform various functions described herein.

The RU communications manager 345 may manage communications with RUs 355, and may include a controller or scheduler for controlling communications with UEs 115 in cooperation with RUs 355. For example, the RU communications manager 345 may coordinate scheduling for transmissions to UEs 115. In some examples, the RU communications manager 345 may provide an F1 interface within a wireless communications network technology to provide communication with RUs 355.

The communications manager 320 may support wireless communications at a network node in accordance with examples as disclosed herein. For example, the communications manager 320 may be configured as or otherwise support a means for transmitting, to a first RU, a request for a wireless resource configuration for a first time period. The communications manager 320 may be configured as or otherwise support a means for transmitting, to a second RU, an interference inquiry associated with the wireless resource configuration for the first time period. The communications manager 320 may be configured as or otherwise support a means for receiving, from the second RU, a response to the interference inquiry. The communications manager 320 may be configured as or otherwise support a means for transmitting, based on the response to the interference inquiry, a payload to the first RU for transmission during the first time period.

By including or configuring the communications manager 320 in accordance with examples as described herein, the device 305 may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

In some examples, the communications manager 320 may be configured to perform various operations (e.g., receiving, monitoring, transmitting) using or otherwise in cooperation with other components. Although the communications manager 320 is illustrated as a separate component, in some examples, one or more functions described with reference to the communications manager 320 may be supported by or performed by the processor 340, the memory 330, the code 335, or any combination thereof. For example, the code 335 may include instructions executable by the processor 340 to cause the device 305 to perform various aspects of RU sharing techniques in wireless communications as described herein, or the processor 340 and the memory 330 may be otherwise configured to perform or support such operations.

Figure 4:
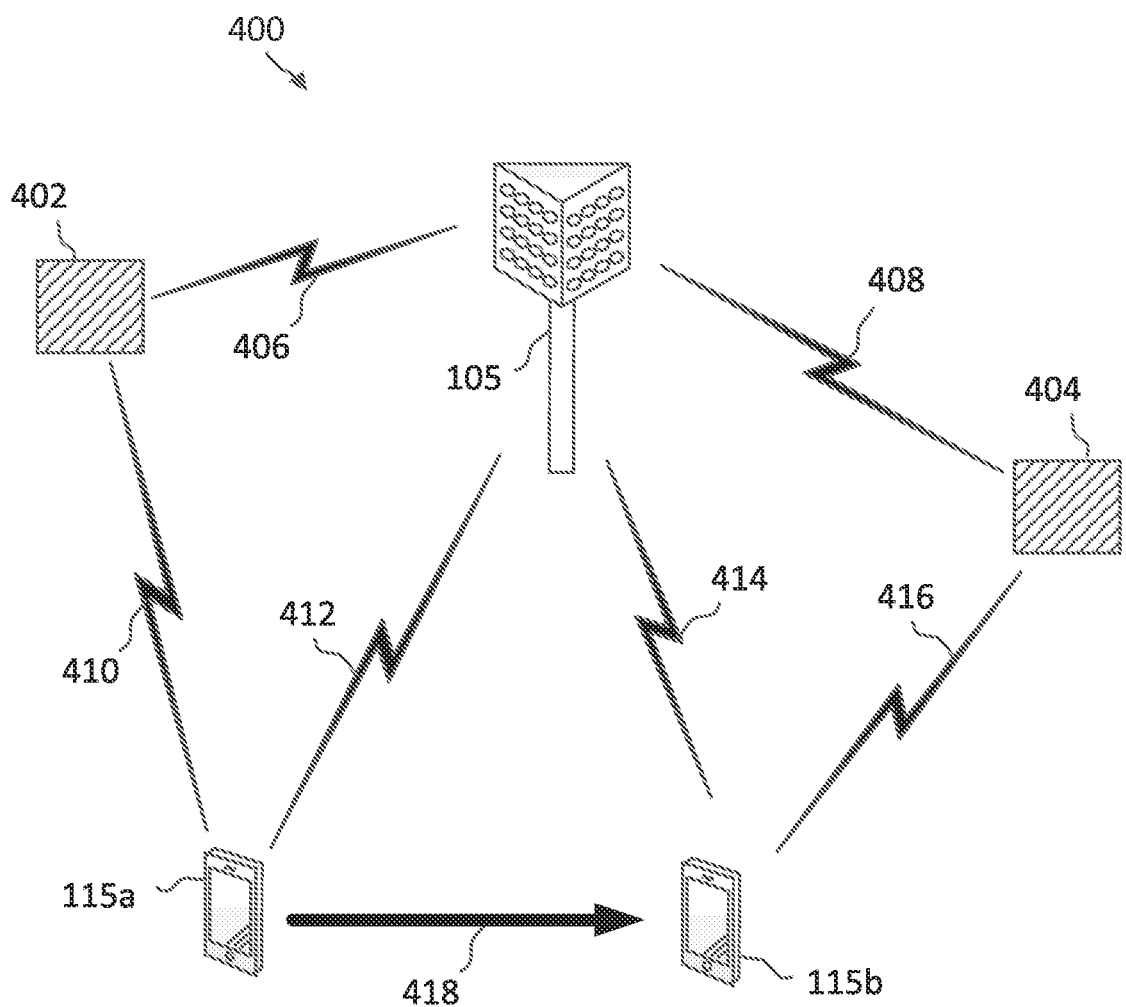
FIG. 4 illustrates an example communication scenario of a wireless communication network according to some aspects of the present disclosure.

FIG. 4 illustrates an example communication scenario of a wireless communication network 400 according to some aspects of the present disclosure. Network 400 includes a UE 115a, a UE 115b, and a BS 105. Communication beams are represented as jagged lines. BS 105 may operate, at least some of the time, in a full-duplex mode, allowing for BS 105 to receive signals from UE 115a (e.g., via beam 412) while transmitting signals to UE 115b (e.g., via beam 414). As illustrated, different beam directions may be used for communication with each of the devices. For example, UE 115a may communicate with BS 105 either using beam 412, or using beam 410, which becomes beam 406 upon reflection from reflective object 402. Likewise, UE 115b may communicate with BS 105 either using beam 414, or using beam 416, which is a reflection of beam 408 off of reflective object 404. When UE 115a is transmitting at the same time that UE 115b is receiving, there is a potential for cross-link interference (CLI) 418.

As described further herein with reference to FIGS. 5-10, BS 105 may coordinate with UEs 115a and 115b to avoid using beams that cause excess interference. For example, BS 105 may communicate a CLI transmission resource to UE 115a indicating transmit beam 412, and a CLI reception resource to UE 115b indicating reception beam 414. Based on these resources, UE 115a may transmit a reference signal using transmit beam 412, and UE 115b may make a measurement using receive beam 414. If the measured interference 418 is above a predetermined threshold, UE 115b may indicate to BS 105 in a report that the beam pair including beams 412 and 414 is non-preferred. If the measured interference 418 is below the predetermined threshold, UE 115b may indicate to BS 105 in a report that the beam pair including beams 412 and 414 is preferred. The report from UE 115b may also include the measurement value itself so that the BS 105 may make the determination.

Based on the report from UE 115b, BS 105 may schedule full-duplex communication using only the preferred beams. For example, if the beam pair comprising beams 412 and 414 is non-preferred, BS 105 may schedule communication using beams 410 and 416. In some aspects, BS 105 may communicate to UEs 115a and 115b restricted beams so that those beams are not used while the BS is performing full-duplex communication. BS 105 may restrict particular beams, entire beam groups, or antenna panels. For example, BS 105 may determine that a particular antenna panel on UE 115a causes excess interference based on a report from UE 115b, and may indicate to UE 115a that the antenna panel is restricted. UE 115a may then use a different antenna panel for communication with BS 105.

Figure 5:
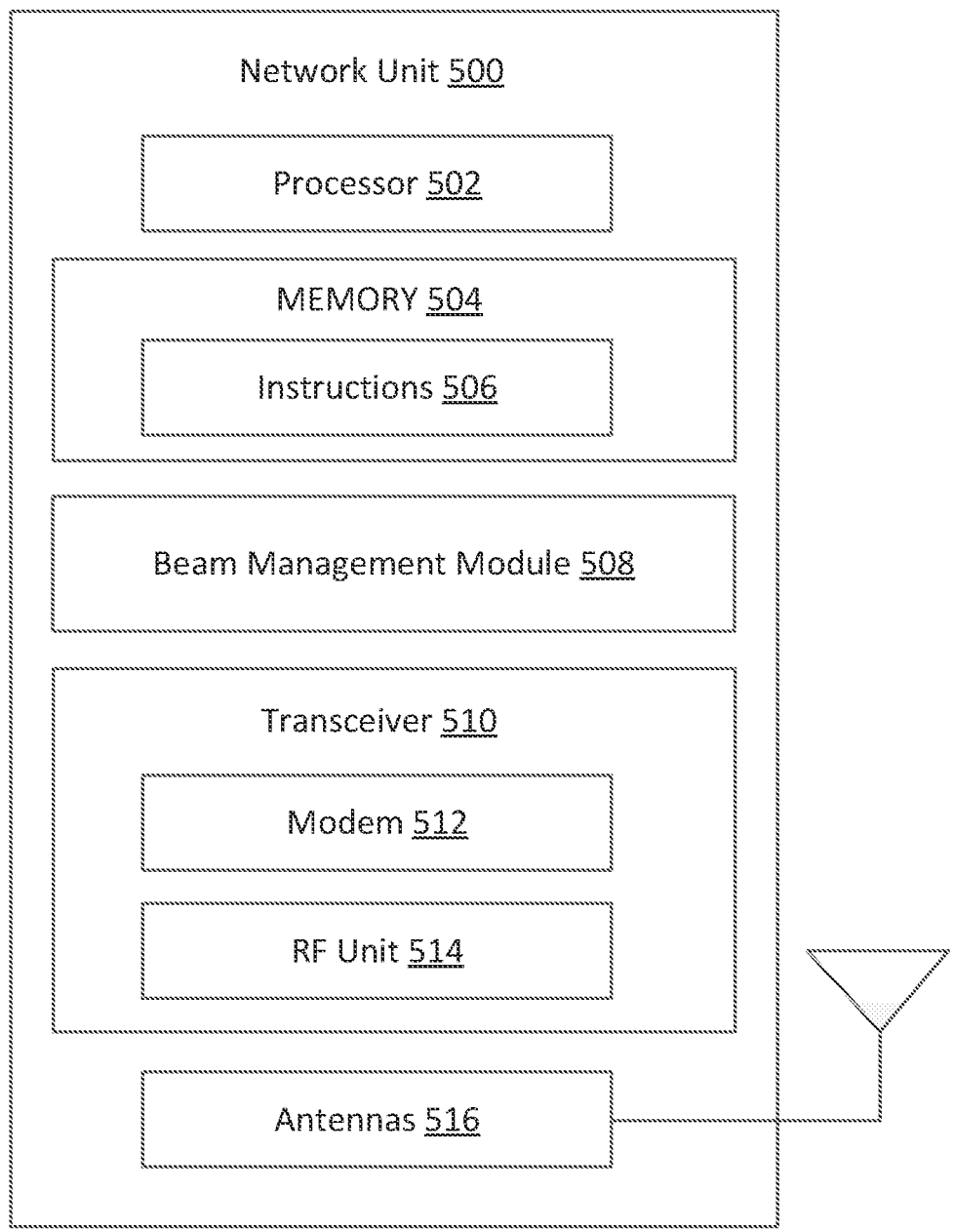
FIG. 5 illustrates a block diagram of a base station (BS) according to some aspects of the present disclosure.

FIG. 5 is a block diagram of an exemplary network unit 500 according to some aspects of the present disclosure. The network unit 500 may be a BS 105 as discussed in FIGS. 1 and 4, or be made up of disaggregated units as described with reference to FIGS. 2-3. As shown, the network unit 500 may include a processor 502, a memory 504, a beam management module 508, a transceiver 510 including a modem subsystem 512 and a RF unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4 and 6-10. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may include a single computer-readable statement or many computer-readable statements.

The beam management module 508 may be implemented via hardware, software, or combinations thereof. For example, the beam management module 508 may be implemented as a processor, circuit, and/or instructions 506 stored in the memory 504 and executed by the processor 502. In some examples, the beam management module 508 can be integrated within the modem subsystem 512. For example, the beam management module 508 can be implemented by a combination of software components (e.g., executed by a DSP or a general processor) and hardware components (e.g., logic gates and circuitry) within the modem subsystem 512. The beam management module 508 may communicate with one or more components of network unit 500 to implement various aspects of the present disclosure, for example, aspects of FIGS. 1-4 and 6-10.

In some aspects, the beam management module 508 may be configured to transmit, to a first UE 115, an indication of a CLI transmission resource. The CLI transmission resource may include a time and/or frequency allocation for the first UE 115 to transmit a reference signal for CLI measurement and/or characterization. The CLI transmission resource may also indicate a specific transmit beam with which to transmit the reference signal where the transmit beam may be selected as one that would otherwise be used for UL signal transmission to the network unit 500. The CLI transmission resource may be indicated semi-statically. For example, the beam management module 508 may be configured to transmit the indication of the CLI transmission resource via RRC signaling, DCI, and/or other suitable communication. The beam management module 508 may be configured to transmit the indication of the CLI transmission resource via PDCCH, PDSCH, broadcast channel, and/or other suitable channel.

The beam management module 508 may be configured to transmit, to a second UE 115, an indication of a CLI reception resource. The CLI reception resource may indicate a time and frequency allocation for the first UE 115 to measure CLI. The CLI reception resource may also indicate a specific receive beam with which to measure the CLI, where the receive beam may be selected as one that would otherwise be used for DL signal reception from the network unit 500. The beam management module 508 may be configured to transmit the indication of the CLI reception resource via RRC signaling, DCI, and/or other suitable communication. The beam management module 508 may be configured to transmit the indication of the CLI reception resource via PDCCH, PDSCH, broadcast channel, and/or other suitable channel.

The beam management module 508 may receive, from the second UE 115, a report comprising an indication based on a measurement of a reference signal associated with a first beam of the CLI transmission resources, the measurement associated with the CLI reception resource. The report may include an indication of preferred/non-preferred beams as determined by the second UE 115. In some aspects, the report may include only, or in addition to the preferred/non-preferred beam, the measurement(s) (e.g., SRS-RSRP, CLI-RSS, RSRP, RSSI, RSRQ, SNR, and/or SINR) and/or an indication of the measurement(s). Preferred/non-preferred beams may be indicated by reference to the CLI resource, or another identifier. The report may include the most recent information based on the latest measurement, or may include accumulated information based on multiple CLI measurements over time. For example, if the latest measurement resulted in a non-preferred beam determination, then the second UE 115 may indicate a beam from a previous measurement in the report as preferred. The second UE 115 may transmit the report using a preconfigured physical uplink control channel (PUCCH) resource, an uplink grant based on a service request, or a medium access control-control element (MAC-CE).

The beam management module 508 may transmit, to the first UE 115, a communication based on the report. In some aspects, the communication may indicate a restricted beam to the first UE 115. The restriction may be at the level of an individual beam, a beam group, or an antenna panel. In some aspects, the restriction only applies in certain circumstances. For example, the beam may be restricted for a given synchronization signal block (SSB) as a quasi-colocation (QCL) source on a particular panel. In some aspects, the beam is restricted when the BS is operating in full duplex, such that the transmit beam could potentially cause excess interference at another UE such as the second UE 115. The restriction may also only apply when another specific UE such as the second UE 115 is receiving.

In some aspects, the communication may be an UL resource scheduling an UL communication with the first UE 115 for a time overlapping a DL communication with the second UE 115. The UL resource may include an indication of a transmit beam. The indicated transmit beam may be selected based on the report received from the second UE 115. For example, if the report indicated that the measured beam using the CLI transmit resource is non-preferred, then the UL resource may indicate a different beam than used in the CLI transmission resource. In another example, the beam is selected because it is indicated in the report as a preferred beam.

As shown, the transceiver 510 may include the modem subsystem 512 and the RF unit 514. The transceiver 510 can be configured to communicate bi-directionally with other devices, such as the UEs 115 and/or BS 105 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., RRC configurations, PDSCH data, PDCCH DCI, etc.) from the modem subsystem 512 (on outbound transmissions) or of transmissions originating from another source such as a UE 115, and/or UE 600. The RF unit 514 may be further configured to perform analog beamforming in conjunction with the digital beamforming. Although shown as integrated together in transceiver 510, the modem subsystem 512 and/or the RF unit 514 may be separate devices that are coupled together at the network unit 500 to enable the network unit 500 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The transceiver 510 may provide the demodulated and decoded data (e.g., CLI reports, etc.) to the beam management module 508 for processing. The antennas 516 may include multiple antennas of similar or different designs in order to sustain multiple transmission links.

In an aspect, the network unit 500 can include multiple transceivers 510 implementing different RATs (e.g., NR and LTE). In an aspect, the network unit 500 can include a single transceiver 510 implementing multiple RATs (e.g., NR and LTE). In an aspect, the transceiver 510 can include various components, where different combinations of components can implement different RATs.

Figure 6:
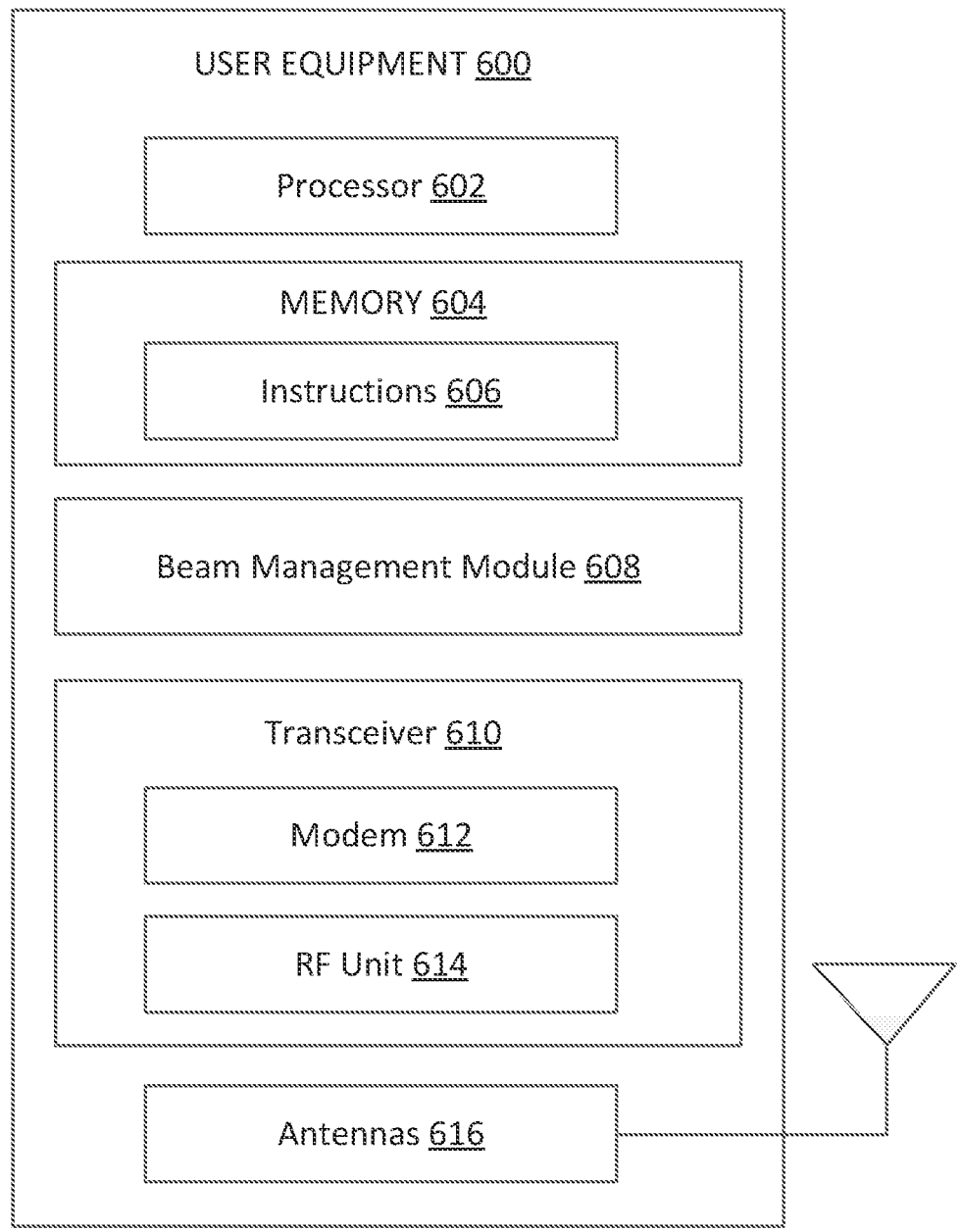
FIG. 6 illustrates a block diagram of a user equipment (UE) according to some aspects of the present disclosure.

FIG. 6 is a block diagram of an exemplary UE 600 according to some aspects of the present disclosure. The UE 600 may be a UE 115 as discussed in FIGS. 1-4. As shown, the UE 600 may include a processor 602, a memory 604, a beam management module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to a UE 115 or an anchor in connection with aspects of the present disclosure, for example, aspects of FIGS. 1-5 and 7-10. Instructions 606 may also be referred to as code, which may be interpreted broadly to include any type of computer-readable statement(s).

The beam management module 608 may be implemented via hardware, software, or combinations thereof. For example, the beam management module 608 may be implemented as a processor, circuit, and/or instructions 606 stored in the memory 604 and executed by the processor 602. In some aspects, the beam management module 608 can be integrated within the modem subsystem 612. For example, the beam management module 608 can be implemented by a combination of software components (e.g., executed by a DSP or a general processor) and hardware components (e.g., logic gates and circuitry) within the modem subsystem 612. The beam management module 608 may communicate with one or more components of UE 600 to implement various aspects of the present disclosure, for example, aspects of FIGS. 1-5 and 7-10.

In some aspects, beam management module 608 may be configured to receive, from a network entity such as a BS 105, an indication of a CLI transmission resource. The resource may indicate a time and frequency allocation for the management module 608 to transmit a reference signal for CLI characterization. The resource may also indicate a specific transmit beam with which to transmit the reference signal where the transmit beam may be selected as one that would otherwise be used for UL signal transmission to the network entity. The resource may be indicated semi-statically for example via RRC signaling and may be indicated and/or activated more dynamically via DCI. The beam management module 608 may then transmit, based on the CLI transmission resource, a reference signal using a first beam.

The management module 608 may receive, from the network entity, a communication comprising an indication of a beam based on a measurement of the reference signal. In some aspects, the communication may indicate a restricted beam to the UE 600. The restriction may be at the level of an individual beam, a beam group, or an antenna panel. In some aspects, the restriction only applies in certain circumstances. For example, the beam may be restricted for a given synchronization signal block (SSB) as a quasi-colocation (QCL) source on a particular panel. In some aspects, the beam is restricted when the network entity is operating in full duplex, such that the transmit beam could potentially cause excess interference at another UE. The restriction may also only apply when another specific UE is receiving.

In some aspects, the communication may be an UL resource scheduling an UL communication with the UE 600 for a time overlapping a DL communication with a second UE 600. The UL resource may include an indication of a transmit beam. The indicated transmit beam may be selected based on a report received from a second UE 600. For example, if the report indicated that a measured beam using the CLI transmit resource is non-preferred, then the UL resource may indicate a different beam than used in the CLI transmission resource. In another example, the beam is selected because it is indicated in the report as a preferred beam.

In some aspects, management module 608 receives, from a network entity, a CLI reception resource. The resource may indicate a time and frequency allocation for the first UE 600 to measure CLI. The resource may also indicate a specific receive beam with which to measure the CLI, where the receive beam may be selected as one that would otherwise be used for DL signal reception from the network entity. The resource may be indicated semi-statically for example via RRC signaling and may be indicated and/or activated more dynamically via DCI.

The management module 608 may receive, based on the CLI reception resource, a reference signal from a second UE 600 via a first beam. The management module 608 may take a measurement of the reference signal which may include sounding reference signal-reference signal received power (SRS-RSRP), cross link interference-received signal strength (CLI-RSS), reference signal received power (RSRP), reference signal strength indicator (RSSI), reference signal received quality (RSRQ), signal to noise ratio (SNR), and/or signal to interference plus noise ratio (SINR).

The management module 608 may transmit, to the network entity, a report comprising an information based on a measurement of the reference signal. The report may include an indication based on the CLI measurement. The report may include an indication of preferred/non-preferred beams as determined by the first UE 115. In some aspects, the report may include only, or in addition to the preferred/non-preferred beam, the measurements (e.g., SRS-RSRP, CLI-RSS, RSRP, RSSI, RSRQ, SNR, and/or SINR). Preferred/non-preferred beams may be indicated by reference to the CLI resource, or another identifier. The report may include the most recent information based on the latest measurement or may include accumulated information based on multiple CLI measurements over time. For example, if the latest measurement resulted in a non-preferred beam determination, then the first UE 600 may indicate a beam from a previous measurement in the report as preferred. The first UE 600 may transmit the report using a preconfigured physical uplink control channel (PUCCH) resource, an uplink grant based on a service request, or a medium access control-control element (MAC-CE).

As shown, the transceiver 610 may include the modem subsystem 612 and the RF unit 614. The transceiver 610 can be configured to communicate bi-directionally with other devices, such as the BSs 105 and 500. The modem subsystem 612 may be configured to modulate and/or encode the data from the memory 604 and/or the beam management module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., CLI reports, etc.) or of transmissions originating from another source such as a UE 115, or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 600 to enable the UE 600 to communicate with other devices.

The RF unit 614 may provide the modulated and/or processed data, e.g., data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., RRC configurations, PUSCH configurations, SRS resource configurations, PUCCH configurations, etc.) to the beam management module 608 for processing. The antennas 616 may include multiple antennas of similar or different designs in order to sustain multiple transmission links.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
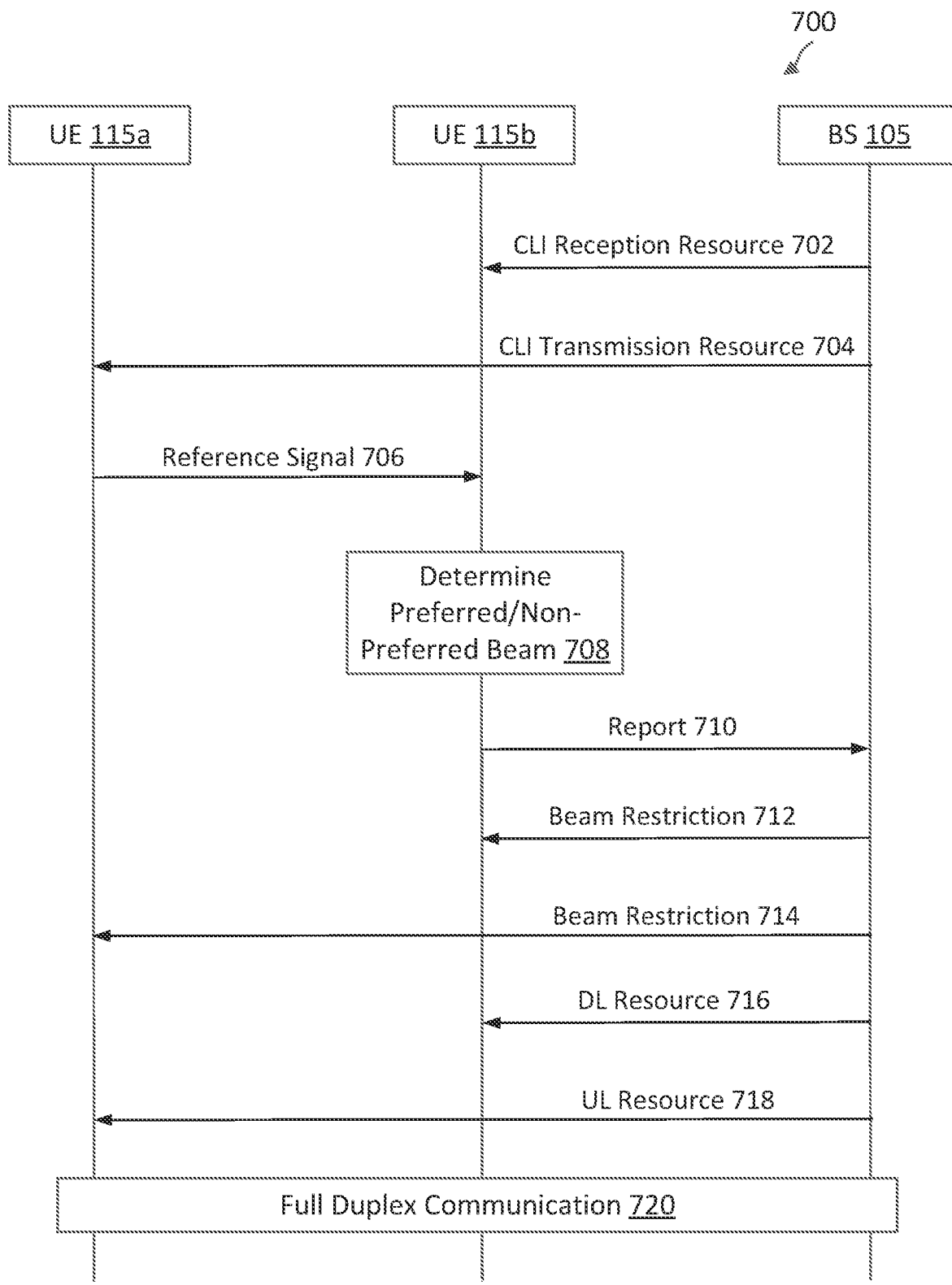
FIG. 7 is a signaling diagram according to some aspects of the present disclosure.

FIG. 7 is a signaling diagram 700 according to some aspects of the present disclosure. The diagram 700 is employed by a BS 105 such as the BSs 105 discussed with reference to FIGS. 1-4, and UEs 115a and 115b such as the UEs 115 discussed with reference to FIGS. 1-4.

In some aspects, the BS 105 may utilize one or more components, such as the processor 502, the memory 504, the beam management module 508, the transceiver 510, the modem 512, and the one or more antennas 516 shown in FIG. 5, and the UEs 115 may utilize one or more components, such as the processor 602, the memory 604, the beam management module 608, the transceiver 610, the modem 612, and the one or more antennas 616 shown in FIG. 6. As illustrated, the signaling diagram 700 includes a number of enumerated actions, but aspects of FIG. 7 may include additional actions before, after, and in between the enumerated actions. In some aspects, one or more of the enumerated actions may be omitted, combined together, or performed in a different order.

At action 702, BS 105 transmits an indication of a CLI reception resource to UE 115b. The CLI reception resource may include a time and frequency allocation for UE 115b to measure CLI. The CLI reception resource may also indicate a specific receive beam with which to measure the CLI. The receive beam may be based on a beam that would otherwise be used for signal reception for a DL communication from the BS 105. The CLI reception resource may be communicated via RRC signaling, DCI, and/or other suitable communication. The indication of the CLI reception resource may be transmitted via PDCCH, PDSCH, broadcast channel, and/or other suitable channel.

At action 704, BS 105 transmits an indication of a CLI transmission resource to UE 115a. The CLI transmission resource may include a time and frequency allocation for UE 115a to transmit a reference signal for CLI characterization. The CLI transmission resource may also indicate a specific transmit beam with which to transmit the reference signal. The transmit beam may be based on a beam that would otherwise be used for signal transmission for an UL communication to the BS 105. The CLI transmission resource may be communicated via RRC signaling, DCI, and/or other suitable communication. The indication of the CLI transmission resource may be transmitted via PDCCH, PDSCH, broadcast channel, and/or other suitable channel.

At action 706, UE 115a transmits the reference signal according to the CLI transmission resource. The reference signal may be received by the UE 115b based on the CLI reception resource. The UE 115b may make a measurement based on the reference signal. The measurement may include SRS-RSRP, CLI-RSS, RSRP, RSSI, RSRQ, SNR, and/or SINR.

At action 708, UE 115b may determine a preferred beam and/or a non-preferred beam based on the measurement. In some instances, the UE may determine a preferred transmit/ receive beam pair based on the measurement. For example, a beam pair including a particular transmit beam associated with UE 115*a* and a particular receive beam associated with UE 115*b* may be preferred if the interference measurement associated with that beam pair is below a predetermined threshold, and non-preferred if the measurement is above the predetermined threshold. The UE 115*b* may make measurements for one or more beams over time. The UE 115*b* may keep track of and/or store the measurements (e.g., in a table, memory, or other suitable format). and the UE 115*b* may determine and/or identify beam pairs that have the least interference (e.g., preferred beam pairs) and/or the most interference (e.g., non-preferred beam pairs). The UE 115*b* may determine which beams are preferred and/or non-preferred based on the comparison of the measurements.

At action 710, UE 115*b* transmits a report to BS 105 based on the measurement. The report may include an indication of preferred/non-preferred beams as determined at action 708. In some aspects, the report may include only, or in addition to the preferred/non-preferred beam, the measurements (e.g., SRS-RSRP, CLI-RSS, RSRP, RSSI, RSRQ, SNR, and/or SINR). When only providing the measurements, action 708 may be omitted as BS 105 will make the determination based on the measurements without relying on UE 115*b*. Preferred/non-preferred beams may be indicated by reference to the CLI resource, or another identifier. The report may include the most recent information based on the latest measurement, or may include accumulated information based on multiple CLI measurements over time. For example, if the latest measurement resulted in a non-preferred beam determination, then UE 115*b* may indicate a beam from a previous measurement in the report as preferred. UE 115*b* may transmit the report using a preconfigured physical uplink control channel (PUCCH) resource, an uplink grant based on a service request, or a medium access control-control element (MAC-CE).

At action 712, BS 105 transmits a message indicating a restricted beam to UE 115*b*. The restriction may be at the level of an individual beam, a beam group, or an antenna panel. In some aspects, the restriction only applies in certain circumstances. For example, the beam may be restricted for a given synchronization signal block (SSB) as a quasi-colocation (QCL) source on a particular panel. In some aspects, the beam is restricted when the BS is operating in full duplex, such that the receive beam could potentially receive excess interference from another UE such as UE 115*a*. The restriction may also only apply when another specific UE such as UE 115*a* is transmitting. In some aspects, the beam may be restricted during certain slots (e.g., during the next N slots, or for a pattern of slots) based on an indication from BS 105.

At action 714, BS 105 transmits a message indicating a restricted beam to UE 115*a*. The restriction may be at the level of an individual beam, a beam group, or an antenna panel. In some aspects, the restriction only applies in certain circumstances. For example, the beam may be restricted for a given synchronization signal block (SSB) as a quasi-colocation (QCL) source on a particular panel. In some aspects, the beam is restricted when the BS is operating in full duplex, such that the transmit beam could potentially cause excess interference at another UE such as UE 115*b*. The restriction may also only apply when another specific UE such as UE 115*b* is receiving.

At action 716, BS 105 transmits a DL resource to UE 115*b* to schedule a DL communication. The DL resource may include an indication of a receive beam. The indicated receive beam may be selected based on the report received from UE 115*b*. For example, if the report indicated that the measured beam using the CLI reception resource is non-preferred, then the DL resource may indicate a different beam than used in the CLI reception resource. In another example, the beam is selected because it is indicated in the report as a preferred beam. In some aspects, the DL resource does not indicate a specific beam, but UE 115*b* selects a receive beam based on the beam restriction at action 712.

At action 718, BS 105 transmits an UL resource to UE 115*a* to schedule a UL communication for a time overlapping the DL communication with UE 115*b*. The UL resource may include an indication of a transmit beam. The indicated transmit beam may be selected based on the report received from UE 115*b*. For example, if the report indicated that the measured beam using the CLI transmit resource is non-preferred, then the UL resource may indicate a different beam than used in the CLI transmission resource. In another example, the beam is selected because it is indicated in the report as a preferred beam. In some aspects, the UL resource does not indicate a specific beam, but UE 115*a* selects a transmit beam based on the beam restriction at action 714.

At action 720, the BS communicates in full-duplex, transmitting to UE 115*b* based on the DL resource while receiving from UE 115*a* based on the UL resource. As the beams used for UL and DL are selected based on the CLI measurements, the signal from UE 115*a* may interfere less with the reception by UE 115*b*. The above description has UE 115*a* transmitting signals and UE 115*b* receiving signals. Each action described above as being performed by UE 115*a* may be performed also by UE 115*b*, either in addition to or separate from the above description. For example, BS 105 may configure UE 115*b* to be the transmitter and UE 115*a* to be the receiver, and UE 115 may make the measurements and communicate a report as described above. In some aspects, interference from both UE 115*a* and UE 115*b* are characterized. BS 105 may schedule communications with both UE 115*a* and UE 115*b* based on the interference measurements including communicating restricted beams for transmit and/or receive for both UE 115*a* and UE 115*b*.

Figure 8:
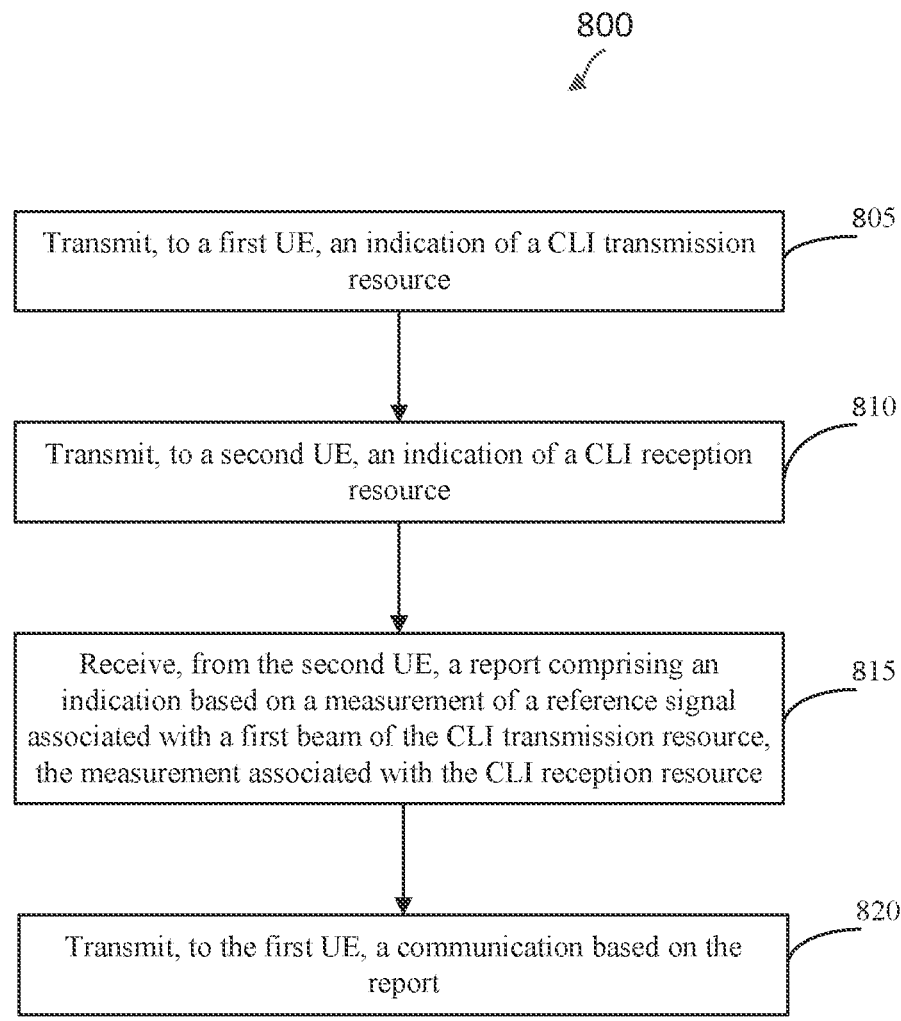
FIG. 8 is a flow diagram of a wireless communication method according to some aspects of the present disclosure.

FIG. 8 is a flow diagram illustrating a wireless communication method 800 according to some aspects of the present disclosure. Aspects of the method 800 can be executed by a computing device (e.g., a processor, processing circuit, and/or other suitable component) of a wireless communication device or other suitable means for performing the blocks. In one aspect, a BS 105, or 500, may utilize one or more components, such as the processor 502, the memory 1004, the beam management module 508, the transceiver 510, the modem 512, the RF unit 514, and the one or more antennas 516, to execute the blocks of method 800.

As illustrated, the method 800 includes a number of enumerated blocks, but aspects of the method 800 may include additional blocks before, after, and in between the enumerated blocks. In some aspects, one or more of the enumerated blocks may be omitted or performed in a different order.

At block 805, a network entity transmits, to a first UE 115, an indication of a CLI transmission resource. The resource may indicate a time and frequency allocation for the first UE 115 to transmit a reference signal for CLI characterization. The resource may also indicate a specific transmit beam with which to transmit the reference signal where the transmit beam may be selected as one that would otherwise be used for UL signal transmission to the BS 105. The resource may be indicated semi-statically for example via RRC signaling and may be indicated and/or activated more dynamically via DCI.

At block 810, the network entity transmits, to a second UE 115, an indication of a CLI reception resource. The resource may indicate a time and frequency allocation for the first UE 115 to measure CLI. The resource may also indicate a specific receive beam with which to measure the CLI, where the receive beam may be selected as one that would otherwise be used for DL signal reception from the BS 105. The resource may be indicated semi-statically for example via RRC signaling and may be indicated and/or activated more dynamically via DCI.

At block 815, the network entity receives, from the second UE 115, a report comprising an indication based on a measurement of a reference signal associated with a first beam of the CLI transmission resources, the measurement associated with the CLI reception resource. The report may include an indication of preferred/non-preferred beams as determined by the second UE 115. In some aspects, the report may include only, or in addition to the preferred/non-preferred beam, the measurements (e.g., SRS-RSRP, CLI-RSS, RSRP, RSSI, RSRQ, SNR, and/or SINR).

Preferred/non-preferred beams may be indicated by reference to the CLI resource, or another identifier. The report may include the most recent information based on the latest measurement, or may include accumulated information based on multiple CLI measurements over time. For example, if the latest measurement resulted in a non-preferred beam determination, then the second UE 115 may indicate a beam from a previous measurement in the report as preferred. The second UE 115 may transmit the report using a preconfigured physical uplink control channel (PUCCH) resource, an uplink grant based on a service request, or a medium access control-control element (MAC-CE).

At block 820, the network entity transmits, to the first UE 115, a communication based on the report. In some aspects, the communication may indicate a restricted beam to the first UE 115. The restriction may be at the level of an individual beam, a beam group, or an antenna panel. In some aspects, the restriction only applies in certain circumstances. For example, the beam may be restricted for a given synchronization signal block (SSB) as a quasi-colocation (QCL) source on a particular panel. In some aspects, the beam is restricted when the BS is operating in full duplex, such that the transmit beam could potentially cause excess interference at another UE such as the second UE 115. The restriction may also only apply when another specific UE such as the second UE 115 is receiving.

In some aspects, the communication may be an UL resource scheduling an UL communication with the first UE 115 for a time overlapping a DL communication with the second UE 115. The UL resource may include an indication of a transmit beam. The indicated transmit beam may be selected based on the report received from the second UE 115. For example, if the report indicated that the measured beam using the CLI transmit resource is non-preferred, then the UL resource may indicate a different beam than used in the CLI transmission resource. In another example, the beam is selected because it is indicated in the report as a preferred beam.

Figure 9:
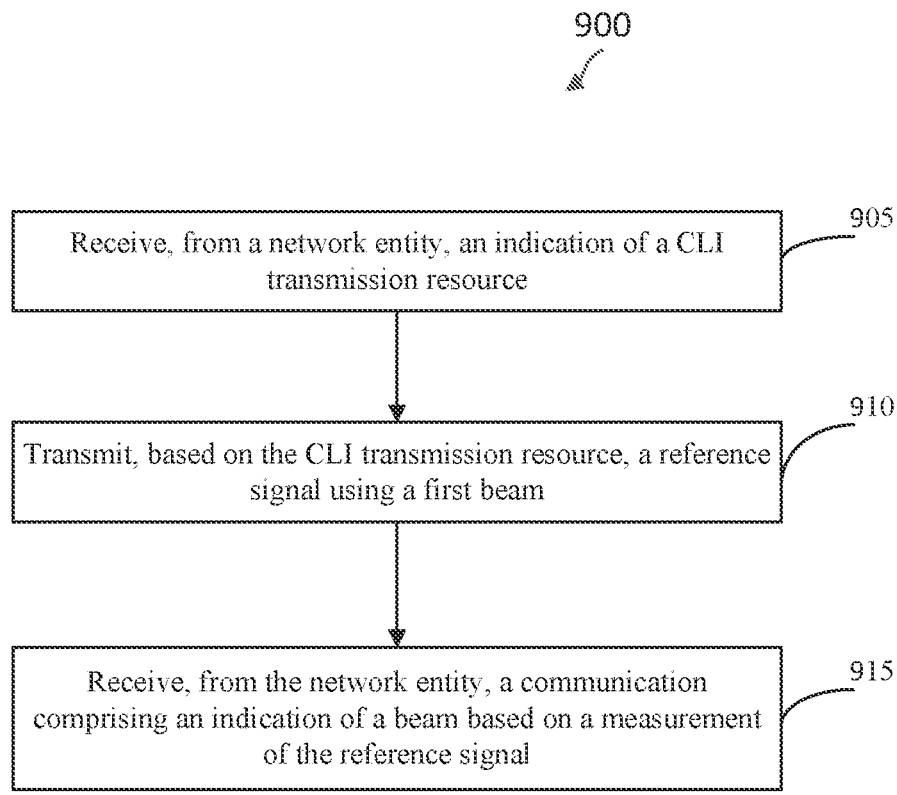
FIG. 9 is a flow diagram of a wireless communication method according to some aspects of the present disclosure.

FIG. 9 is a flow diagram illustrating a wireless communication method 900 according to some aspects of the present disclosure. Aspects of the method 900 can be executed by a computing device (e.g., a processor, processing circuit, and/or other suitable component) of a wireless communication device or other suitable means for performing the blocks. In one aspect, a UE 115, or 600, may perform the method 900 utilizing components such as the processor 602, the memory 604, the beam management module 608, the transceiver 610, the modem 612, and the one or more antennas 616 shown in FIG. 6.

As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 905, a UE 115 receives, from a network entity, an indication of a CLI transmission resource. The resource may indicate a time and frequency allocation for the UE 115 to transmit a reference signal for CLI characterization. The resource may also indicate a specific transmit beam with which to transmit the reference signal where the transmit beam may be selected as one that would otherwise be used for UL signal transmission to the network entity. The resource may be indicated semi-statically for example via RRC signaling and may be indicated and/or activated more dynamically via DCI.

At block 910, the UE 115 transmits, based on the CLI transmission resource, a reference signal using a first beam.

At block 915, the UE 115 receives, from the network entity, a communication comprising an indication of a beam based on a measurement of the reference signal. In some aspects, the communication may indicate a restricted beam to the UE 115. The restriction may be at the level of an individual beam, a beam group, or an antenna panel. In some aspects, the restriction only applies in certain circumstances. For example, the beam may be restricted for a given synchronization signal block (SSB) as a quasi-colocation (QCL) source on a particular panel. In some aspects, the beam is restricted when the network entity is operating in full duplex, such that the transmit beam could potentially cause excess interference at another UE. The restriction may also only apply when another specific UE is receiving.

In some aspects, the communication may be an UL resource scheduling an UL communication with the UE 115 for a time overlapping a DL communication with a second UE 115. The UL resource may include an indication of a transmit beam. The indicated transmit beam may be selected based on a report received from a second UE 115. For example, if the report indicated that a measured beam using the CLI transmit resource is non-preferred, then the UL resource may indicate a different beam than used in the CLI transmission resource. In another example, the beam is selected because it is indicated in the report as a preferred beam.

Figure 10:
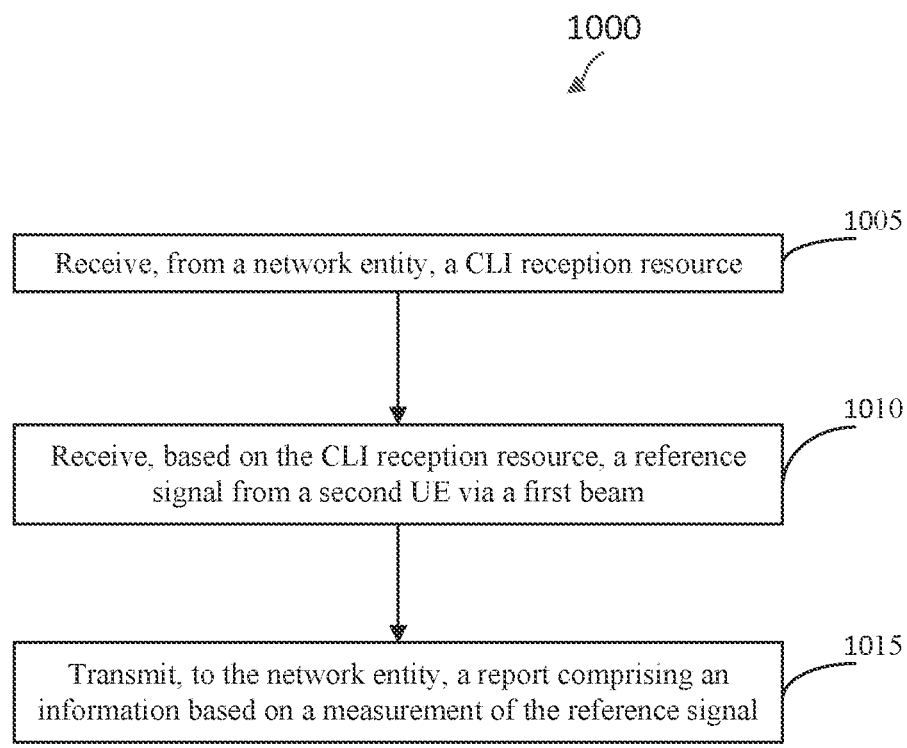
FIG. 10 is a flow diagram of a wireless communication method according to some aspects of the present disclosure.

FIG. 10 is a flow diagram illustrating a wireless communication method 1000 according to some aspects of the present disclosure. Aspects of the method 1000 can be executed by a computing device (e.g., a processor, processing circuit, and/or other suitable component) of a wireless communication device or other suitable means for performing the blocks. In one aspect, a UE 115, or 600, may perform the method 1000 utilizing components such as the processor 602, the memory 604, the beam management module 608, the transceiver 610, the modem 612, and the one or more antennas 616 shown in FIG. 6.

As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1005, a first UE 115 receives, from a network entity, a CLI reception resource. The resource may indicate a time and frequency allocation for the first UE 115 to measure CLI. The resource may also indicate a specific receive beam with which to measure the CLI, where the receive beam may be selected as one that would otherwise be used for DL signal reception from the network entity. The resource may be indicated semi-statically for example via RRC signaling and may be indicated and/or activated more dynamically via DCI.

At block 1010, the first UE 115 receives, based on the CLI reception resource, a reference signal from a second UE 115 via a first beam. The first UE 115 may take a measurement of the reference signal which may include SRS-RSRP, CLI-RSS, RSRP, RSSI, RSRQ, SNR, and/or SINR.

At block 1015, the first UE 115 transmits, to the network entity, a report comprising an information based on a measurement of the reference signal. The report may include an indication based on the CLI measurement. The report may include an indication of preferred/non-preferred beams as determined by the first UE 115. In some aspects, the report may include only, or in addition to the preferred/non-preferred beam, the measurements (e.g., SRS-RSRP, CLI-RSS, RSRP, RSSI, RSRQ, SNR, and/or SINR). Preferred/non-preferred beams may be indicated by reference to the CLI resource, or another identifier. The report may include the most recent information based on the latest measurement, or may include accumulated information based on multiple CLI measurements over time. For example, if the latest measurement resulted in a non-preferred beam determination, then the first UE 115 may indicate a beam from a previous measurement in the report as preferred. The first UE 115 may transmit the report using a preconfigured physical uplink control channel (PUCCH) resource, an uplink grant based on a service request, or a medium access control-control element (MAC-CE).

Further aspects of the present disclosure include the following:

Aspect 1. A method of wireless communication performed by a network entity, the method comprising:
  transmitting, to a first user equipment (UE), an indication of a cross link interference (CLI) transmission resource;
  transmitting, to a second UE, an indication of a CLI reception resource;
  receiving, from the second UE, a report comprising an indication based on a measurement of a reference signal associated with a first beam of the CLI transmission resource, the measurement associated with the CLI reception resource; and
  transmitting, to the first UE, a communication based on the report.

Aspect 2. The method of aspect 1, wherein the measurement includes at least one of:
  a sounding reference signal-reference signal received power (SRS-RSRP) measurement; or
  a cross link interference-received signal strength (CLI-RSS) measurement.

Aspect 3. The method of any of aspects 1-2, wherein the report comprises an indication of a non-preferred inter-UE beam pair associated with the CLI reception resource.

Aspect 4. The method of any of aspects 1-3, wherein the report comprises an indication of a preferred inter-UE beam pair.

Aspect 5. The method of any of aspects 1-4, wherein the report comprises the measurement.

Aspect 6. The method of any of aspects 1-5, wherein the transmitting the communication comprises:
  transmitting an indication that the first UE is restricted from transmitting using at least one of:
  the first beam;
  a beam group; or
  an antenna panel.

Aspect 7. The method of any of aspects 1-6, further comprising:
  transmitting, to the second UE, a second communication based on the report,
  wherein the second UE is restricted from receiving using at least one of:
  a second beam;
  a beam group; or
  an antenna panel.

Aspect 8. The method of any of aspects 1-5, wherein the transmitting the communication comprises:
  transmitting, to the first UE, an indication of a second beam for use by the first UE, the second beam being different than the first beam.

Aspect 9. The method of any of aspects 1-8, wherein the report is received using a least one of:
  a preconfigured physical uplink control channel (PUCCH) resource;
  an uplink grant based on a service request; or
  a medium access control-control element (MAC-CE).

Aspect 10. A method of wireless communication performed by a user equipment (UE), the method comprising:
  receiving, from a network entity, an indication of a cross link interference (CLI) transmission resource;
  transmitting, based on the CLI transmission resource, a reference signal using a first beam; and
  receiving, from the network entity, a communication comprising an indication of a beam based on a measurement of the reference signal.

Aspect 11. The method of aspect 10, wherein the measurement includes at least one of:
  a sounding reference signal-reference signal received power (SRS-RSRP) measurement; or
  a cross link interference-received signal strength (CLI-RSS) measurement.

Aspect 12. The method of any of aspects 10-11, wherein the receiving the communication comprises:
  receiving an indication that the UE is restricted from transmitting using at least one of:
  the first beam;
  a beam group; or
  an antenna panel.

Aspect 13. The method of any of aspects 10-12, wherein the receiving the communication comprises:
  receiving an indication of a second beam for use by the UE, the second beam being different than the first beam.

Aspect 14. A method of wireless communication performed by a first user equipment (UE), the method comprising:
  receiving, from a network entity, a cross link interference (CLI) reception resource;
  receiving, based on the CLI reception resource, a reference signal from a second UE via a first beam; and
  transmitting, to the network entity, a report comprising an information based on a measurement of the reference signal.

Aspect 15. The method of aspect 14, wherein the measurement includes at least one of:

a sounding reference signal-reference signal received power (SRS-RSRP) measurement; or a CLI-received signal strength (CLI-RSS) measurement.

Aspect 16. The method of any of aspects 14-15, wherein the transmitting the report comprises: transmitting an indication of a non-preferred inter-UE beam pair.

Aspect 17. The method of aspect 16, wherein the non-preferred inter-UE beam pair is based on the measurement exceeding a predetermined threshold.

Aspect 18. The method of aspect 16, wherein the non-preferred inter-UE beam pair is based on the measurement being higher than a second measurement associated with a second beam.

Aspect 19. The method of any of aspects 14-15, wherein the report comprises the measurement.

Aspect 20. The method of any of aspects 14-19, wherein the report is transmitted using a least one of:
 a preconfigured physical uplink control channel (PUCCH) resource;
 an uplink grant based on a service request; or
 a medium access control-control element (MAC-CE).

Aspect 21. A network entity, comprising:
 a memory;
 a transceiver; and
 a processor coupled with the memory and the transceiver and configured, when executing instructions stored on the memory, to cause the network entity to:
  transmit, to a first user equipment (UE), an indication of a cross link interference (CLI) transmission resource;
 transmitting, to a second UE, an indication of a CLI reception resource;
  receive, from the second UE, a report comprising an indication based on a measurement of a reference signal associated with a first beam of the CLI transmission resource, the measurement associated with the CLI reception resource; and
  transmit, to the first UE, a communication based on the report.

Aspect 22. The network entity of aspect 21, wherein the measurement includes at least one of:
 a sounding reference signal-reference signal received power (SRS-RSRP) measurement; or
 a cross link interference-received signal strength (CLI-RSS) measurement.

Aspect 23. The network entity of any of aspects 21-22, wherein the report comprises an indication of a non-preferred inter-UE beam pair associated with the CLI reception resource.

Aspect 24. The network entity of any of aspects 21-23, wherein the report comprises an indication of a preferred inter-UE beam pair.

Aspect 25. The network entity of any of aspects 21-24, wherein the report comprises the measurement.

Aspect 26. The network entity of any of aspects 21-25, wherein the processor is further configured to:
 transmit an indication that the first UE is restricted from transmitting using at least one of:
  the first beam;
  a beam group; or
  an antenna panel.

Aspect 27. The network entity of any of aspects 21-26, wherein the processor is further configured to:
 transmit, to the second UE, a second communication based on the report,
 wherein the second UE is restricted from receiving using at least one of:
  a second beam;
  a beam group; or
  an antenna panel.

Aspect 28. The network entity of any of aspects 21-25, wherein the processor is further configured to:
 transmit, to the first UE, an indication of a second beam for use by the first UE, the second beam being different than the first beam.

Aspect 29. The network entity of any of aspects 21-28, wherein the report is received using a least one of:
 a preconfigured physical uplink control channel (PUCCH) resource;
 an uplink grant based on a service request; or
 a medium access control-control element (MAC-CE).

Aspect 30. The network entity of any of aspects 21-29, wherein the report comprises an indication of a preferred inter-UE beam pair associated with the CLI reception resource.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a network entity, the method comprising:
   transmitting, to a first user equipment (UE), an indication of a cross link interference (CLI) transmission resource;
   transmitting, to a second UE, an indication of a CLI reception resource;
   receiving, from the second UE, a report comprising an indication based on a measurement of a reference signal associated with a first beam of the CLI transmission resource, the measurement associated with the CLI reception resource; and
   transmitting, to the first UE, a communication based on the report including an indication that the first UE is restricted from transmitting using an antenna panel.

2. The method of claim 1, wherein the measurement includes at least one of:
   a sounding reference signal-reference signal received power (SRS-RSRP) measurement; or
   a cross link interference-received signal strength (CLI-RSS) measurement.

3. The method of claim 1, wherein the report comprises an indication of a non-preferred inter-UE beam pair associated with the CLI reception resource.

4. The method of claim 1, wherein the report comprises an indication of a preferred inter-UE beam pair.

5. The method of claim 1, wherein the report comprises the measurement.

6. The method of claim 1, wherein the transmitting the communication comprises:
   transmitting the indication that the first UE is restricted from transmitting using
   the antenna panel when the network entity is operating in full duplex.

7. The method of claim 1, further comprising:
   transmitting, to the second UE, a second communication based on the report,
   wherein the second UE is restricted from receiving using at least one of:
   a second beam;
   a beam group; or
   an antenna panel.

8. The method of claim 1, wherein the transmitting the communication comprises:
   transmitting, to the first UE, an indication of a second beam for use by the first UE, the second beam being different than the first beam.

9. The method of claim 1, wherein the report is received using a least one of:
   a preconfigured physical uplink control channel (PUCCH) resource;
   an uplink grant based on a service request; or
   a medium access control-control element (MAC-CE).

10. A method of wireless communication performed by a user equipment (UE), the method comprising:
    receiving, from a network entity, an indication of a cross link interference (CLI) transmission resource;
    transmitting, based on the CLI transmission resource, a reference signal using a first beam; and
    receiving, from the network entity, a communication comprising an indication based on a measurement of the reference signal that the UE is restricted from transmitting using an antenna panel.

11. The method of claim 10, wherein the measurement includes at least one of:
    a sounding reference signal-reference signal received power (SRS-RSRP) measurement; or
    a cross link interference-received signal strength (CLI-RSS) measurement.

12. The method of claim 10, wherein the receiving the communication comprises:
    receiving the indication that the UE is restricted from transmitting using
    the antenna panel when the network entity is operating in full duplex.

13. The method of claim 10, wherein the receiving the communication comprises:
    receiving an indication of a second beam for use by the UE, the second beam being different than the first beam.

14. A method of wireless communication performed by a first user equipment (UE), the method comprising:
    receiving, from a network entity, a cross link interference (CLI) reception resource;
    receiving, based on the CLI reception resource, a reference signal from a second UE via a first beam;
    transmitting, to the network entity, a report comprising an information based on a measurement of the reference signal; and
    receiving, from the network entity, a communication based on the report including an indication that the first UE is restricted from receiving using an antenna panel.

15. The method of claim 14, wherein the measurement includes at least one of:
    a sounding reference signal-reference signal received power (SRS-RSRP) measurement; or
    a CLI-received signal strength (CLI-RSS) measurement.

16. The method of claim 14, wherein the transmitting the report comprises:
    transmitting an indication of a non-preferred inter-UE beam pair.

17. The method of claim 16, wherein the non-preferred inter-UE beam pair is based on the measurement exceeding a predetermined threshold.

18. The method of claim 16, wherein the non-preferred inter-UE beam pair is based on the measurement being higher than a second measurement associated with a second beam.

19. The method of claim 14, wherein the report comprises the measurement.

20. The method of claim 14, wherein the report is transmitted using a least one of:
    a preconfigured physical uplink control channel (PUCCH) resource;
    an uplink grant based on a service request; or
    a medium access control-control element (MAC-CE).

21. A network entity, comprising:
    one or more memories; and
    one or more processors coupled to the one or more memories, the one or more memories storing instructions that are executable by the one or more processors, configured individually or in any combination, to cause the network entity to:
    transmit, to a first user equipment (UE), an indication of a cross link interference (CLI) transmission resource;
    transmit, to a second UE, an indication of a CLI reception resource;
    receive, from the second UE, a report comprising an indication based on a measurement of a reference signal associated with a first beam of the CLI transmission resource, the measurement associated with the CLI reception resource; and transmit, to the first UE, a communication based on the report including an indication that the first UE is restricted from transmitting using an antenna panel.

22. The network entity of claim 21, wherein the measurement includes at least one of:
 a sounding reference signal-reference signal received power (SRS-RSRP) measurement; or
 a cross link interference-received signal strength (CLI-RSS) measurement.

23. The network entity of claim 21, wherein the report comprises an indication of a non-preferred inter-UE beam pair associated with the CLI reception resource.

24. The network entity of claim 21, wherein the report comprises an indication of a preferred inter-UE beam pair.

25. The network entity of claim 21, wherein the report comprises the measurement.

26. The network entity of claim 21, wherein the one or more processors are further configured to cause the network entity to:
 transmit the indication that the first UE is restricted from transmitting using
  the antenna panel when the network entity is operating in full duplex.

27. The network entity of claim 21, wherein the one or more processors are further configured to cause the network entity to:
 transmit, to the second UE, a second communication based on the report,
 wherein the second UE is restricted from receiving using at least one of:
  a second beam;
  a beam group; or
  an antenna panel.

28. The network entity of claim 21, wherein the one or more processors are further configured to cause the network entity to:
 transmit, to the first UE, an indication of a second beam for use by the first UE, the second beam being different than the first beam.

29. The network entity of claim 21, wherein the report is received using a least one of:
 a preconfigured physical uplink control channel (PUCCH) resource;
 an uplink grant based on a service request; or
 a medium access control-control element (MAC-CE).

30. The network entity of claim 21, wherein the report comprises an indication of a preferred inter-UE beam pair associated with the CLI reception resource.

* * * * *